United States Patent
Ichikawa et al.

(10) Patent No.: US 9,343,725 B2
(45) Date of Patent: May 17, 2016

(54) BUS BAR MODULE AND POWER SUPPLY UNIT

(71) Applicant: Yazaki Corporation, Tokyo (JP)

(72) Inventors: Yoshiaki Ichikawa, Kakegawa (JP); Hiroyuki Kato, Kakegawa (JP); Yoshikazu Ezuka, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 201 days.

(21) Appl. No.: 14/153,438

(22) Filed: Jan. 13, 2014

(65) Prior Publication Data

US 2014/0212732 A1     Jul. 31, 2014

(30) Foreign Application Priority Data

Jan. 30, 2013    (JP) ................................ 2013-015403

(51) Int. Cl.
*H02G 5/06*      (2006.01)
*H01M 2/20*      (2006.01)

(52) U.S. Cl.
CPC ..................................... *H01M 2/206* (2013.01)

(58) Field of Classification Search
CPC ..... H01M 2/202; H01M 2/204; H01M 2/206; H02G 5/06
USPC .......................... 429/158, 160–161; 174/68.2
See application file for complete search history.

(56) References Cited

U.S. PATENT DOCUMENTS

2011/0097620 A1*   4/2011   Kim .............................. 429/161

FOREIGN PATENT DOCUMENTS

JP        2012-109196 A     6/2012

\* cited by examiner

*Primary Examiner* — James Lee
(74) *Attorney, Agent, or Firm* — Locke Lord LLP; James E. Armstrong, IV; Brian S. Matross

(57) ABSTRACT

Disclosed is a bus bar module and a power source unit capable of reducing manufacturing cost thereof. A bus bar module (1) includes a plurality of bus bars (3) arranged in line so as to connect a plurality of batteries (3) in series; a plurality of housings (50) housing each of the bus bars (3) and each including a placement part (51) on which each of the bus bar (3) is placed; a pair of opposite walls (52) upstanding from the placement, part (51) and opposed to each other, a continuing wall (52) continuous with the pair of opposite walls (52), and an opening (54) located opposed to the continuing wall (53); and a flat circuit board (4) connected to each of the bus bars (3) and arranged in an arrangement direction X of the bus bars (3), the flat circuit board (4) being, with a width direction thereof along an upstanding direction of the pair of opposite walls (52), attached to the housings (50) so as to cover the opening (54).

8 Claims, 5 Drawing Sheets

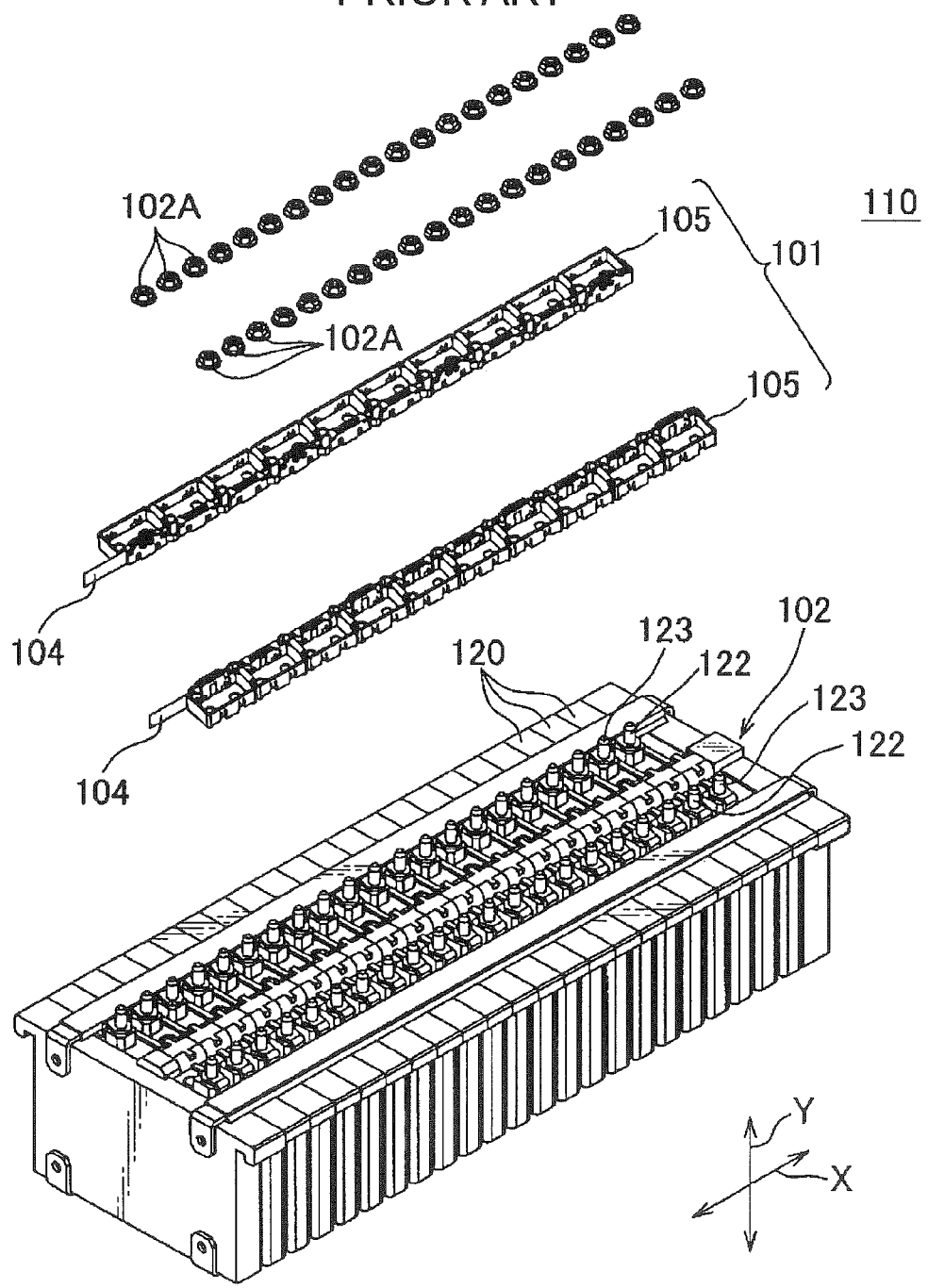

BUS BAR MODULE AND POWER SUPPLY UNIT

CROSS REFERENCE TO RELATED APPLICATION

This application is on the basis of Japanese Patent Application NO. 2013-015403, the contents of which are hereby incorporated by reference.

TECHNICAL FIELD

This invention relates to bus bar modules and power supply units, in particular to bus bar modules connecting in series a plurality of batteries, and power supply units including the bus bar nodule.

BACKGROUND ART

For example, an electric vehicle running with electric motor or a hybrid vehicle running with engine and electric motor together has the aforementioned power source unit mounted thereto as power source of the electric motor. This power source unit is provided with a bus bar module as recited in the PTL 1 listed below.

As shown in FIGS. 5 and 6, the bus bar module is attached to a battery assembly 102 formed in such a fashion that batteries 120 including a positive electrode 122 at one end and a negative electrode 123 at the other end are alternately and oppositely overlaid, thus connects in series the overlaid batteries with each other, and is provided with a plurality of bus bars 103 straightly arranged in two lines so as to connect in series fine plurality of batteries 120, a pair or FFCs (flexible flat cable) 104 connected with each of the bus bar 103 and wired along a arrangement direction of the plurality of bus bars 103 (wiring direction X), and a pair of cases 105 housing lire plurality of bus bars 103 and the pair of FFCs 104. As shown in FIG. 5, such the bus bar module 101, with it overlaid on a top of the battery assembly 102, has each of the bus bars 103 electrically connect electrodes 122, 123 of the adjacent batteries 120 by a nut 102A being threaded into electrodes 122, 123 of each of the batteries 120, and thus is set into the battery assembly 102.

As shown in FIG. 6, the FFC 104 is provided with a plurality of conductors 140 ($140_1$ to $140_n$) separated from each other, and a cover 141 insulating and covering the plurality of conductors $140_1$ to $140_n$. The FFC 104 is arranged such that the plurality of conductors $140_1$ to $140_n$ is arranged in the same direction as a direction Y of connecting piece 131 of the bus bar 103 (to be described later) upstanding.

As shown in FIG. 6, the bus bars 103 are each provide with a plate-like bus bar body 130, a connection piece 131 upstanding from the bus bar body 130 and being connected to one conductor $140_n$ of the FFC 104.

As shown in FIG. 6, the case 105 is separately provided with a bus bar housing 151 housing the plurality of bus bars 103, and an FFC cover 152 assembled in the bus bar housing 131 and clipping and holding the FFC 104 between the FFC cover 152 and the bus bar housing 151. The bus bar housing 151 is provided with housings 153 arranged in the arrangement direction X and housing each of the bus bars 103, and a coupler 154 coupling these housings 153. The FFC cover 152 is disposed across its whole length and continued in the arrangement direction X.

The housings 153 are each provide with a rectangular placement part 153A where the has bars 103 are each placed, and four partition walls 153B upstanding from the placement part 153A, and are formed into a frame shape with bottom. Of the four partition walls 153B one located near the FFC cover 152 is provided with a slit 155 passing therethrough the connection piece 131 of the bus bar 103. This slit 155 is disposed at a middle of the one partition wall 153B.

The aforementioned conventional bus bar module 101 allows each of the bus bars 103 to be housed in each of the housing 153, and while the connection piece 131 of the bus bar 103 is inserted from the slit 155 of the housing 153 to be guided outside, the connection piece $131_1$ of the endmost bus bar 103 (the first bus bar 103) is joined using ultrasonic with the bottommost conductor $104_1$ of the FFC 104, the second connection piece $131_2$ of the bus bar 103 is joined using ultrasonic with the second conductor $104_2$ of the FFC 104, the nth connection piece $131_n$ of the bus bar 103 is joined using ultrasonic with the nth conductor $104_n$ of the FFC 104, and thereby the bus bars 103 are each electrically connected with the conductors $104_1$ to $104_n$ of the FFC 104 different from each other.

In each the bus bar module 101 each of the bus bars 103 was insulated from outside by being surrounded by the four partition walls 153B of the housing 153 housing the bus bar 103 and by holding the FFC 104 between the bus bar housing 151 and the FFC cover 152.

CITATION LIST

Patent Literature (PTL 1)
Japanese Parent Application Laid-Open Publication No. 2012-109196

SUMMARY OF INVENTION

Technical Problem

Disadvantageously, in the aforementioned conventional bus bar module 101, since each of the bus bars 103 was insulated from outside by being surrounded by the four partition walls 153B of the housing 153 housing the bus bar 103 and by providing the FFC cover 152, usage amount of synthetic resin for insulating the bus bar 103 from outside became large, and thereby manufacturing cost did not become reduced. Also, since the FFC cover 152 holding the FFC 104 between the bus bar housing 151 and the FFC cover 152 was made separately from the bus bar housing 152, the number of component a became increased.

Therefore, an object of the invention is to provide a bus bar module and a power supply unit capable of reducing manufacturing cost by reducing the usage amount of synthetic resin.

Solution to Problem

The invention according to a first aspect is rotated to a bus bar module, including: a plurality of bus bars arranged in line so as to connect in series a plurality of batteries; a plurality of housings housing each of the bus bars and each including a placement part on which earn or the bus bar is placed, a pair or opposite walls upstanding from the placement part and opposed to each other, a continuing wall continuous with the pair of opposite walls, and an opening located opposed to the continuing wall; and a flat circuit board connected to each of the bus bars and arranged in an arrangement direction of the bus bars, the flat circuit board, with a width direction thereof along an upstanding direction of the pair of opposite walls, being attached to the housings so as to cover the opening.

Preferably, each of the housings includes a pair of attaching walls to which the flat circuit board is attached at a position to which the continuing wall is located opposed, and wherein the pair of attaching walls is separated from each other with a space, the opening is composed of the space.

Preferably, each or the housings includes a pair of press pieces clipping the flat circuit board between the pair of press pieces and the pair of attaching walls, and a pair of hinges rotatively coupling the pair of press pieces with the pair of attaching walls, wherein the attaching wall includes a projection passing through the flat circuit board and the press piece and engaged with the press piece, and wherein the flat circuit board is clipped between the attaching wall and the press piece.

The invention according to a second aspect is related to a power supply unit including: a battery assembly formed of a plurality of batteries such that a positive electrode and a negative electrode thereof are alternately and oppositely overlaid; and the bus bar module.

Advantageous Effects of Invention

According to the invention related to the first and secured aspects, since the bus bar module includes: the plurality of bus bars arranged in line so as to connect the plurality of batteries in series; the plurality of housings housing each of the bus bars end each including the placement part on which each of the bus bar is placed, the pair of opposite walls upstanding from the placement part and opposed to each other, the continuing wall continuous with the pair of opposite walls, and the opening located opposed to the continuing wall; and the flat circuit board connected to each of the bus bars and arranged in the arrangement direction of the bus bars, the flat circuit board, with the width direction thereof along the upstanding direction of the pair of opposite walls, being attached to the housings so as to cover the opening, insulating body composing the flat circuit board is, instead of the partition wall and the FFC cover, insulates the bus bar from outside, though conventionally the bus bar was surrounded by the partition walls composing the housing and the FFC cover was disposed so as to insulate from outside, and thereby it is made possible to provide an opening where the flat circuit board is located, reducing usage amount of synthetic resin and thus manufacturing cost.

Furthermore, even though the plurality of housings is formed separately and housings adjacent to each other are not coupled, by the flat circuit board being wired the flat circuit board becomes bridged between the plurality of housings across the housings adjacent to each other, and thus the flat circuit board can couple the housings adjacent to each other. Namely, without a coupling member for coupling the housings adjacent to each other being formed, the flat circuit board, instead of the coupling member, couples the housings adjacent to each other, further reducing usage amount of synthetic resin and thus manufacturing cost.

Since each of the housings includes the pair of attaching walls to which the flat circuit board is attached at a position to which the continuing wall is located opposed, and wherein the pair of attaching walls is spaced from each other with the space, the opening being composed of the space, provision of the pair of attaching walls makes it possible to secure the flat circuit board to the housing.

Since each of the housings includes the pair of press pieces clipping the flat circuit board between the pair of press pieces and the pair of attaching walls, and the pair of hinges rotatively coupling the pair of press pieces with the pair of attaching walls, wherein the attaching wall includes the projection passing through the flat circuit board and the press piece and engaged with the press piece, and wherein the flat circuit board is clipped between the attaching wall and the press piece, the flat circuit board can, without increasing the number of components, be secured to the housing. Also, even when variation within tolerance is induced where electrode of each bus bar is formed, each bus bar moves along with movement of the connection part to each bus bar, and the connection part to each bus bar and the flat circuit board is fixed to the attaching wall by the pair of pressing piece at both ends thereof, restricting relative movement of each bus bar and the flat circuit board, eliminating possibility of exerting stress to the connection part of each bus bar and the flat circuit board, and thereby leading to securely maintaining the connection of each bus bar and the flat circuit board.

BRIEF DESCRIPTION OF DRAWINGS

FIG. 5 is a perspective view illustrating a conventional power source unit; and

DESCRIPTION OF EMBODIMENTS

Referring now to FIGS. 1 to 4, a bus bar module according to one embodiment of the invention will be discussed.

Figure 1:
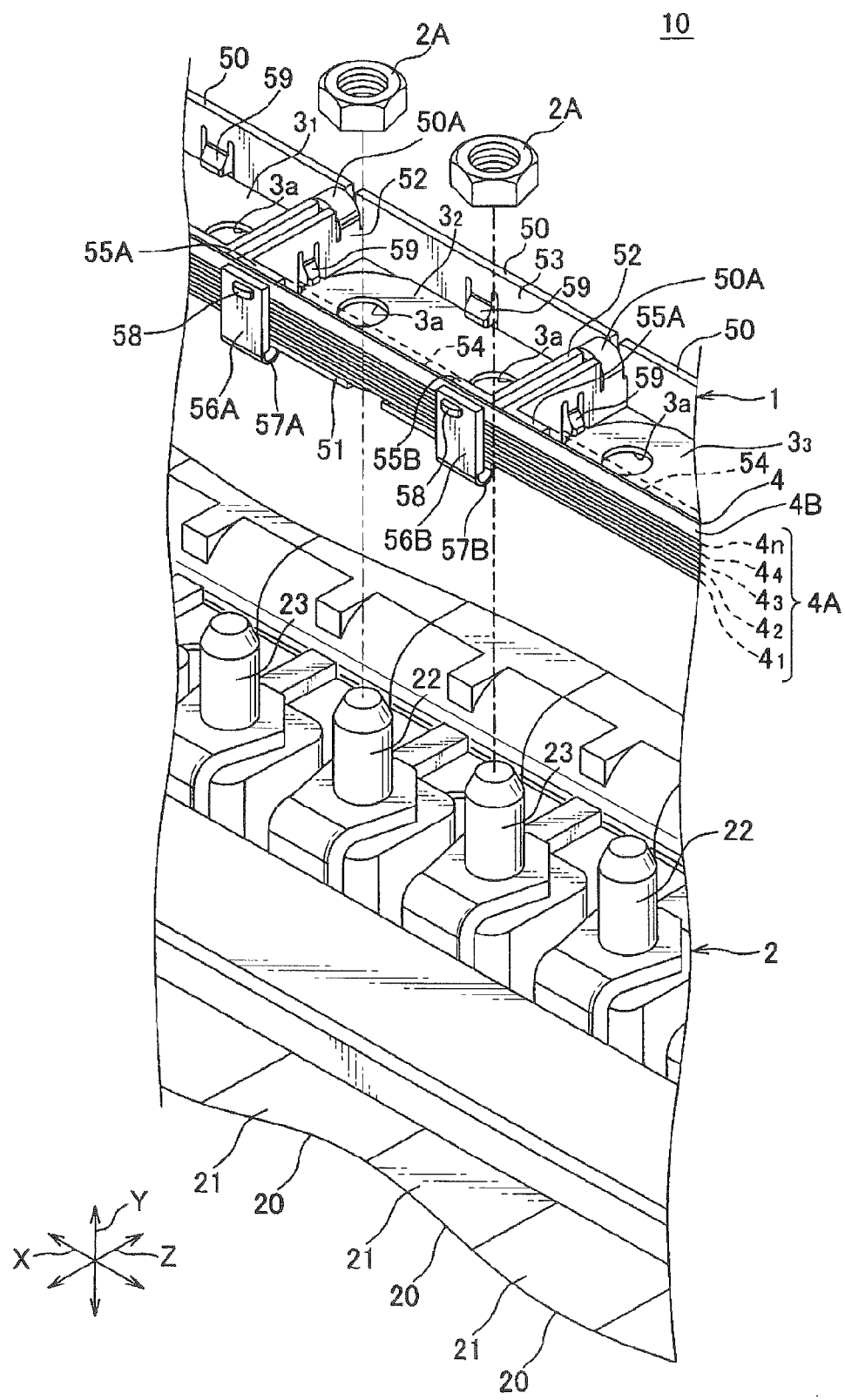
FIG. 1 is a perspective view illustrating a power source unit according to a first embodiment of the invention.

A bus bar module 1 of the invention is mounted on an upper face of a battery assembly 2 and composes a power source unit 10 as shown in FIG. 1. Namely, the power source unit 10 is composed of the battery assembly 2, and a pair of bus bar module 1 to be mounted on the upper face of the battery assembly 2. The power source unit 10 is also designed to be mounted on such an electric vehicle running with an electric motor or a hybrid vehicle running with an engine and the electric motor together, and to supply power to the electric motor.

The battery assembly 2 is, as shown in FIG. 1, provided wish a plurality of batteries 20, a fixing part (not shown) fixing the plurality of batteries 20 overlaid to each other. The plurality of batteries 20 is arranged in such a fashion that positive and negative electrodes are alternately arranged in line along a overlaying direction of the battery. An arrow X in FIG. 1 indicates a overlaying direction of the plurality of batteries 20, the arrangement direction of the bus bar, and a length direction of the bus bar module 1, an arrow Z a width direction of the bus bar module 1, an arrow Y a height direction of each battery, i.e., height direction, or upper and lower direction of the bus bar module 1.

Each battery 20 is provided with a battery main body 21 wherein electrolyte is filled in a box-like container, a positive electrode 22 (corresponding to "electrode" in the claims) and a negative electrode 23 (corresponding to "electrode" in the claims) each protruding both ends of the upper face of the battery main body 21 in the length direction Z. These positive electrode 22 and negative electrode 23 are each formed of conductive metal and into a tubular shape, on an outer peripheral face of which a threaded groove is formed that threads in a nut 2A.

Each bus bar module 1 is designed to connect in series the aforementioned batteries 20, and is as shown in FIG. 1, provided with a plurality of bus bars 3 connecting in series the plurality of batteries 20 by connecting the positive and negative electrodes of the batteries adjacent to each other, FFC (flexible flat cable) 4 electrically connected to each bus bar 3, and a case 5 housing the plurality of bus bars 3 and the FFC 4.

Figure 2:
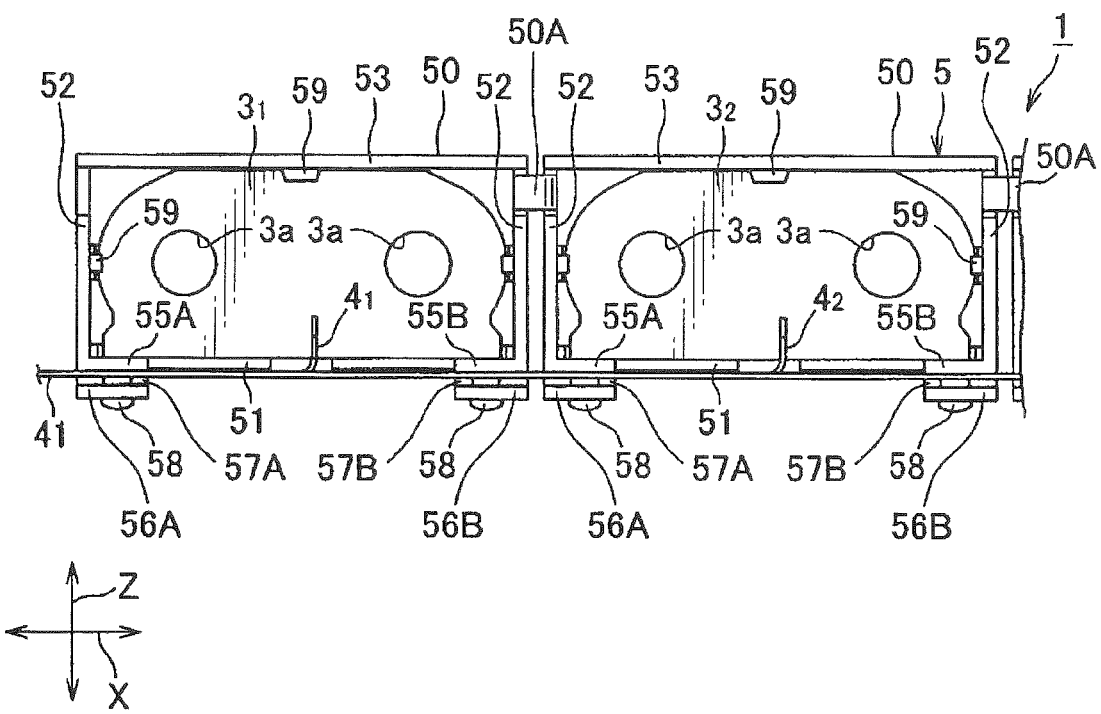
FIG. 2 is a plane view illustrating the power source unit shown in FIG. 1.

The plurality of bus bars 3 is formed by such pressing metal plate, and is, as shown in FIG. 2 as well, configured in such a fashion that on a plate-like metal a pair of electrode insertion hole 3a passing therethrough the positive and negative electrodes adjacent to each other is formed. This bus bar 3 is fixed and electrically connected to one positive electrode 22 and the negative electrode 23 by the nut 2A (shown in FIG. 1) being threaded in the positive electrode 22 and the negative electrode 23 passing through electrode insertion hole 3a.

Figure 4A:
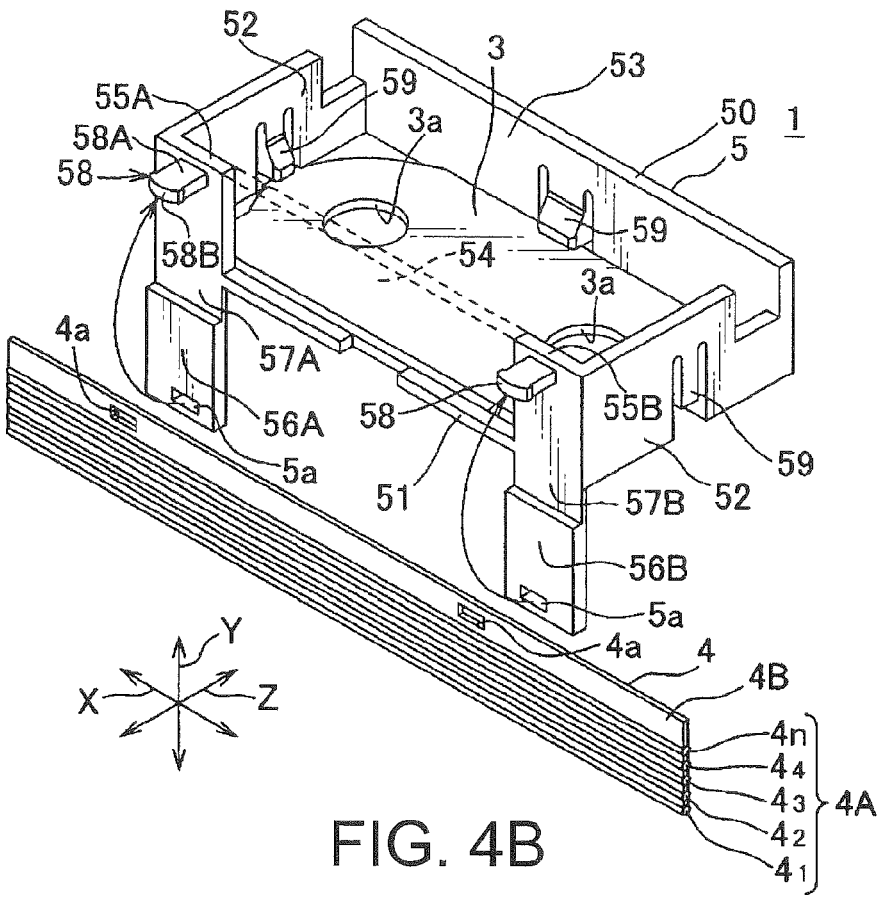
FIG. 4A is a perspective view illustrating a state prior to a press piece of the housing composing the power source shown in FIG. 1 being engaged with a projection.

The FFC 4 is provided with a plurality of conductors 4A spaced from each other, and an insulating cover 43 covering the conductor 4A. The plurality of conductors 4A is composed of conductors $4_1, 4_2, 4_3, 4_4$, and $4_n$ as shown in FIG. 4A, and those conductors $4_1, 4_2, 4_3, 4_4$ and $4n$ are arranged in the arrow Y direction, and attached to the housing 50 so as to cover the opening 54 of the housing 50. In the cover 4B, a through hole 4a passing through a projection 58 disposed in the housing 50 is formed in the plural along the length direction of the FFC 4 (the arrow X direction). These through holes 4a are disposed on an upper end of the FFC 4, and formed where the conductor 4A is not provided.

Such the FFC 4 has, for example, the number of conductors 4n as the same as that of bus bars 3, the conductor $4_1$ located at the undermost of the FFC4 is, as shown in FIG. 1, connected to the leftmost bus bar $3_1$ shown in FIG. 1, the conductor $4_2$ located at the second undermost of the FFC4 the middle bus bar $3_2$ shown in FIG. 1, the conductor $4_3$ located at the third undermost of the FFC4 the rightmost bus bar $3_3$ shown in FIG. 1. Further illustrating, as shown in FIG. 2, the conductor $4_1$ has its end formed so as is cut at the middle of the bus bar $3_1$ in the arrow X direction, with it ezposed from the cover 4B to outside, electrically connect to the bus bar $3_1$, and is kept in contact by such soldering.

The case 5 is overlaid on the upper face of the battery assembly 2, and is provided with each bus bar 3, a plurality of housings 50 housing the FFC 4, and a coupling part 50A coupling the housings 50 adjacent to each other.

The bus bar 50 is as shown in FIG. 4A, each provided with a rectangular plate-like placement, part 51 locating the bus bar 3 on the surface, a pair of opposite walls 52 upstanding from both ones of the placement part 51 in its length direction (the arrow X direction) and opposed to each other, a continuous wall 53 upstanding from one end of the placement part 51 in its width direction (the arrow Z direction) formed continuous with the pair of opposite walls 52, and a pair of attaching walls 55A, 55B upstanding from the other end of the placement part 51 in its width direction, spaced from each other, and formed discontinuous to each other, to which the FFC4 is to be attached, and further includes an opening 54 where the continuous wall 53 is located opposed. This opening 54 is defined by a space located between the pair of attaching walls 55A, 55B formed discontinuous. The placement part 51 has a pair of electrode insertion hole (not shown) formed, through which the positive and negative electrodes 22, 23 of the battery 20 are passed.

Figure 3:
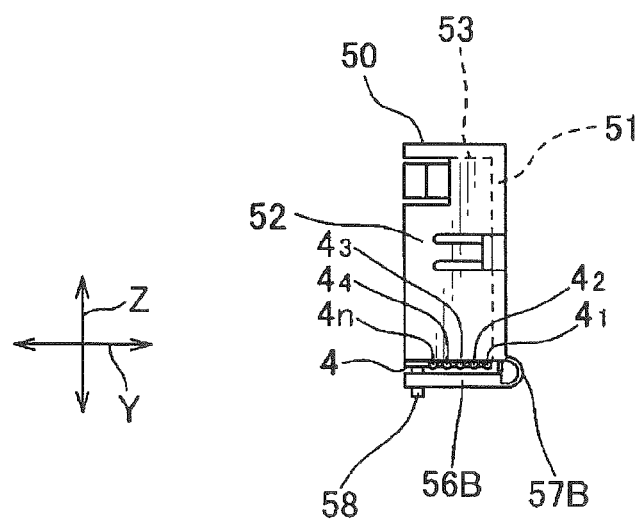
FIG. 3 is a plane view illustrating the power source unit shown in FIG. 2 seeing from different angle.

The housing 50 is also, as shown in FIGS. 3 and 4A, each provided with a pair of press pieces 56A, 56B clipping the FFC 4 between the pair of attaching part 55A, 55 and the pair of press pieces 56A, 56B, and a pair of hinges 57A, 57B rotatively coupling the pair of press pieces 56A, 56B to the pair of attaching parts 55A, 55B. The press pieces 56A, 56B are each plate-shaped, and a size of its face is formed generally as the same as that of an outer face of each of the attaching walls 55A, 55B. Namely, the pair or press pieces 56A, 56B is formed spaced from each other, and has a space ferried at the same position and in the same length between, as the pair of attaching walls 55A, 55B. Also, the press pieces 56A, 56B are each provided with an insertion hole 5a for passing therethrough the projection 55 disposed in the attaching wall 55A, 55B. The hinges 57A, 57B is thinly plate-shaped for its ease flexibility, has one end in its length direction (the arrow Y direction) disposed continuous to each lower end of the attaching walls 55A, 55B and the other end disposed continuous to each press pieces 56 A, 56B. The hinges 57A, 67B are each arranged 180-degree rotative around the arrow X direction.

As shown in FIG. 4A, the projection 58 as provided with a plate-like projection bony 58A projecting from an outer face of each of the attaching walls 55A, 55B, and a latch part 58B disposed projecting from the projection body 58A toward in the X direction, and engaged with a peripheral edge of the insertion hole 5a formed in the press pieces 56A, 56B. The insertion hole 5a formed in each of the press pieces 56A, 56B, and the insertion hole 4a formed in the FFC 4 are formed into generally the same shape, of which shape in its length direction (arrow X direction) is formed into generally the same dimension as that of the projection body 58B in the arrow X direction.

Each housing 50 is as shown in FIG. 4A, each provided with a lock part 59 having the bus bar 3 engaged with the housing 50 to be fixed, which the bus bar is located on the placement part 51 of the housing 50. The lock part 59 is disposed at the middles of each of the opposite walls 52 and the continuous well 53.

Figure 4B:
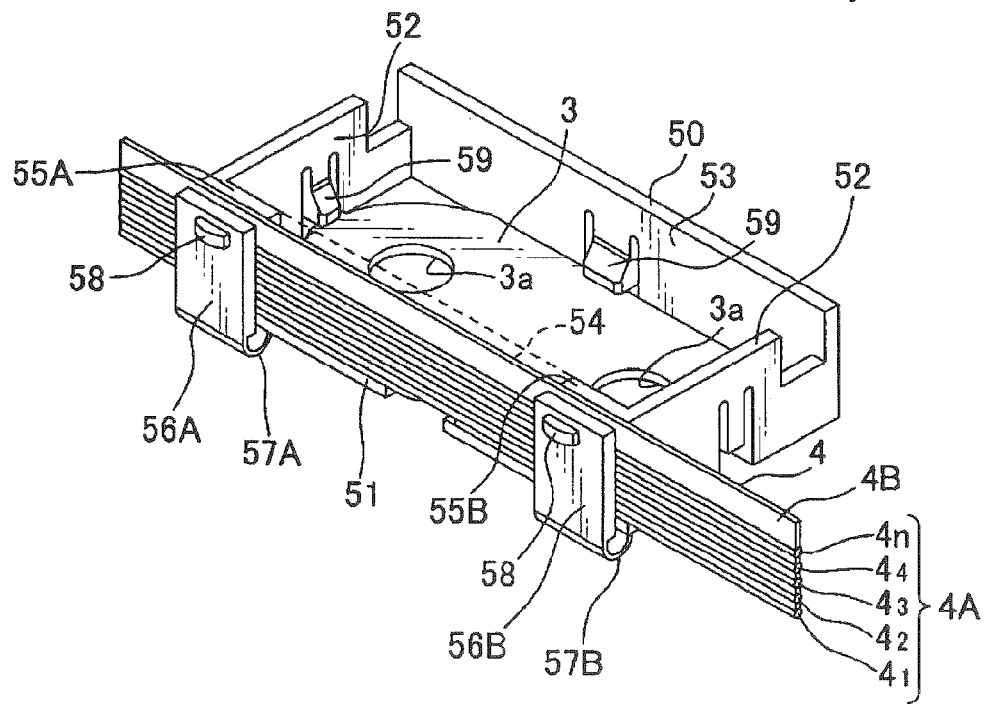
FIG. 4B is a perspective view illustrating a state that the press piece shown in FIG. 4A is engaged with the projection.
Figure 6:
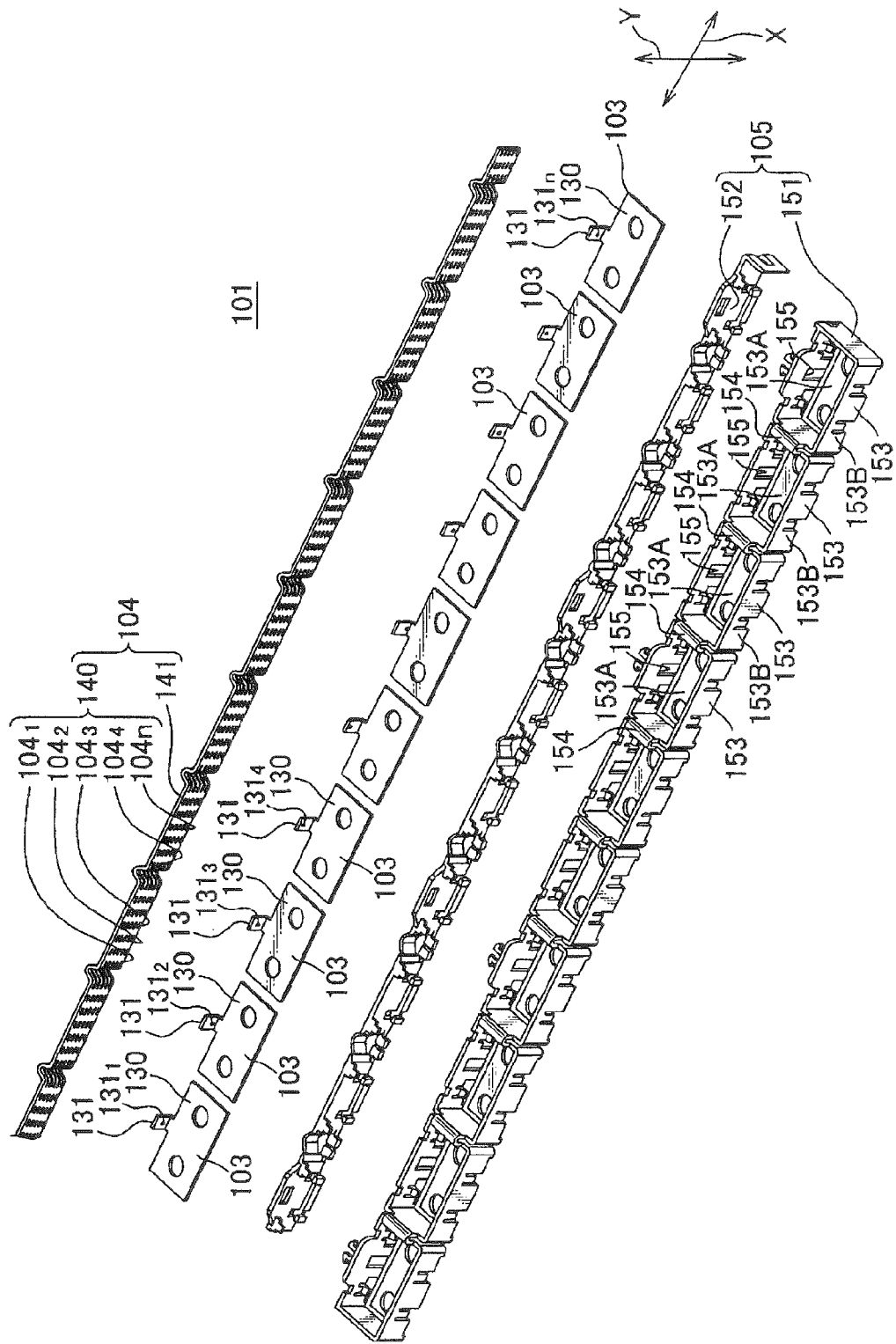
FIG. 6 is an exploded perspective view illustrating a bus bar module composing the power source unit shown in FIG. 5.

Referring now to FIGS. 4A and 4B, a procedure for housing each bus bar 3 into each housing 50, and attaching the FFC 4 to the housing 50 is discussed. Firstly, the bus bar 3, the FFC 4, the case 5 and the like are preliminarily separately made. Then, each bus bar 3 is approached to, and fitted into, the placement part 51 of each housing 50 of the case 5, and each bus bar 3 is engaged with the lock part 59 so as to be housed in each housing 50. The insertion hole 4a of the FFC 4 is, with the width direction of the FFC 4 along the arrow Y direction, inserted into each projection 58, the hinges 57A, 57B are deformed, the press pieces 56A, 56B are rotated, the insertion hole 5a of the press pieces 56A, 56B are approached to the projection 58, and the insertion hole 5a of the press pieces 56A, 56B are pressed into the projection 58. Elastic deformation of the insertion hole 5a of the press pieces 56A, 56B allows the latch 58B to insert into the insertion hole 5a, the latch 58B is, after passing through the insertion hole 5a, engaged with the peripheral edge of the insertion hole 5a. Thus, the FFC 4 is clipped between the pair of attaching walls 55A, 55B and the pair of press pieces 56A, 56B to be attached to the housing 50.

According to such bus bar module 1 and the power source unit 10, the plurality of bus bars 3 arranged in line so as to connect in series the plurality of batteries 20, the plurality of housings 50 housing each of the bus bars 3, the FFC (flat circuit board) 4 connected to each of the bus bars 3 and arranged in the arrangement direction X of the bus bars 3 are provided, each housing 50 includes the placement part 51 on which each of the bus bar 3 is placed, the pair of opposite walls 52 upstanding from the placement part 51 and opposed to each other, the continuing wall 53 continuous with the pair of opposite walls 52, and the opening 54 located opposed to the continuing wall 53, and the flat circuit board 4, with the width direction thereof along the upstanding direction Y of the pair of opposite walls 52, is attached to the housings 50 so as to cover the opening 54, the insulating body (the cover 4B) composing the FFC 4 insulates the bus bar 3 from outside, and thereby it is made possible to provide the opening 54 where the FFC 4 is located, reducing usage amount of synthetic resin and thus manufacturing cost.

Note that in the aforementioned embodiment, the case 5 and the plurality of housings housing the FFC 4, the coupling member 50A coupling the housings 50 adjacent to each other are provided, but the coupling member 50A can be omitted. Namely, the FFC 4 becomes bridged between the housings adjacent to each other, and thus couples the housings 50 adjacent to each other instead of the coupling member 50A, thus omitting the coupling member 50A.

Furthermore, although by the FFC 4 being clipped between the pair of attaching walls 55A, 55B, and the pair of press pieces 56A, 56B the FFC 4 becomes attached to the housing 50, the invention is not limited to this configuration, instead the FFC 4 may be fixed to an end face of the pair of opposite walls 52 using adherent, or double-face tape. In the case, the pair of attaching walls 55A, 55B and the pair of press pieces 56A, 56B may be omitted.

Furthermore, in the aforementioned embodiment, although the conductor $4_1$ is, with the end cut at generally the middle of the bus bar $3_1$ in the X direction, electrically connected to the bus bar 31, and kept in connection using known technology, the invention is not limited to this configuration, instead as the bus bar shown as conventional, the bus bar may be provided with a connecting piece, the connecting piece and the conductor to be connected are joined using ultrasonic, and thereby the bus bar and the FFC are electrically connected.

Furthermore, in the aforementioned embodiment, although the FFC 4 including as the flat circuit board the plurality of conductors 4A, and the cover 4B covering the conductors 4A is utilized, a flat cable may be utilized including the plurality of core wires parallel to each other, a cover covering the core wires, a coupling member coupling the covers adjacent to each other, or ribbon wire without coupling member in which the covers adjacent to each other. Furthermore, as the "flat circuit board" in the claims FFC (flexible printed circuits) may be used.

Note that the aforementioned embodiments merely typically discloses the present invention, and are not intended to limit the invention. Namely, unless otherwise such changes and modifications depart from the scope of the present invention, they should be construed as being included therein.

REFERENCE SIGNS LIST 1 bus bar module
2 battery assembly
3 bus bar
4 FFC (flat circuit board)
10 power source unit
50 housing
51 placement part
52 (pair of) opposite wall(s)
53 continuous wall
54 opening
55A, 55B (pair of) attaching wall(s)
56A, 56B (pair of) press piece(s)
57A, 57B (pair of) hinge(s)
58 projection

The invention claimed is:

1. A bus bar module, comprising:
a plurality of bus bars arranged in line to connect in series a plurality of batteries;
a plurality of housings each housing the bus bars and including:
a placement part on which each of the bus bar is placed, a pair of opposite walls upstanding from the placement part and opposed to each other, a continuing wall continuous with the pair of opposite walls, and an opening defined by the housing opposite the continuing wall; and
a flat circuit board connected to each of the bus bars and arranged in an arrangement direction of the bus bars, the flat circuit board being, with a width direction thereof along an upstanding direction of the pair of opposite walls, attached to the housings so as to cover the opening only by the flat circuit board.

2. The bus bar module as claimed in claim 1, wherein each of the housings includes a pair of attaching walls to which the flat circuit board is attached at a position to which the continuing wall is located opposed, and wherein the pair of attaching walls is separated from each other with a space, the opening being defined by the space.

3. The bus bar module as claimed in claim 1, wherein each of the housings includes a pair of press pieces clipping the flat circuit board between the pair of press pieces and the pair of attaching walls, and a pair of hinges rotatively coupling the pair of press pieces with the pair of attaching walls, wherein the attaching wall includes a projection passing through the flat circuit board and the press piece, and engaged with the press piece, and wherein the flat circuit board is clipped between the attaching wall and the press piece.

4. The bus bar module as claimed in claim 2, wherein each of the housings includes a pair of press pieces clipping the flat circuit board between the pair of press pieces and the pair of attaching walls, and a pair of hinges rotatively coupling the pair of press pieces with the pair of attaching walls, wherein the attaching wall includes a projection passing through the flat circuit board and the press piece, and engaged with the press piece, and wherein the flat circuit board is clipped between the attaching wall and the press piece.

5. A power supply unit comprising:
a battery assembly formed of a plurality of batteries in such a fashion that a positive electrode and a negative electrode thereof are alternately and oppositely overlaid; and
the bus bar module as claimed in claim 1.

6. A power supply unit comprising:
a battery assembly formed of a plurality of batteries in such a fashion that a positive electrode and a negative electrode thereof are alternately and oppositely overlaid; and
the bus bar module as claimed in claim 2.

7. A power supply unit comprising:
a battery assembly formed of a plurality of batteries in such a fashion that a positive electrode and a negative electrode thereof are alternately and oppositely overlaid; and
the bus bar module as claimed in claim 3.

8. A power supply unit comprising:
a battery assembly formed of a plurality of batteries in such a fashion that a positive electrode and a negative electrode thereof are alternately and oppositely overlaid; and
the bus bar module as claimed in claim 4.

* * * * *